Patented July 25, 1944

2,354,231

UNITED STATES PATENT OFFICE 2,354,231

DISUBSTITUTED MALONIC ESTER

Lewis A. Walter, East Orange, N. J., assignor to The Maltbie Chemical Company, Newark, N. J., a corporation of New Jersey No Drawing. Application February 28, 1942, Serial No. 432,887

16 Claims. (Cl. 260—481)

The present invention relates to certain new and useful compositions of matter, namely disubstituted malonic esters having the formula:

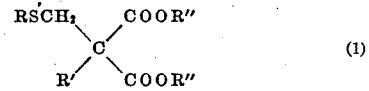  (1)

wherein R and R' are hydrocarbon groups, either saturated or unsaturated, and either the same or different, and each of which contains not more than six carbon atoms, and R has a carbon atom directly attached to the sulfur of the thiomethylene group, and wherein the sum of the carbon atoms in R and R' does not exceed 10; and wherein each R'' group is a lower alkyl group.

These novel compounds have been found to be useful intermediates, particularly in the preparation of barbituric acid and thiobarbituric acid derivatives, including novel compounds of that class forming the subject-matter of certain other applications to be filed concurrently herewith.

My new malonic esters may be prepared by condensing a chloromethyl sulfide, of the type RSCH₂Cl (in which R has the significance stated above) with a sodium malonic ester of the type:

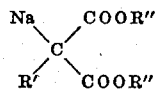

(in which the substituents R' and R'' have the significance stated above), in the presence of an organic solvent such as toluene or anhydrous alcohol, and under appropriate conditions of temperature, such as those which are hereafter fully illustrated in the examples given below. When the reaction is complete, the solvent is removed by distillation and the malonic ester is recovered from the residue by fractional distillation under reduced pressure.

The following specific examples, employing the foregoing general method of preparation, are illustrative of the invention. All the esters described by way of illustration were found to be pale yellow or colorless liquids.

In the following illustrative examples the term "malonic ester" refers, unless otherwise indicated, to the diethyl ester of malonic acid:

EXAMPLE 1

*n-Butyl, ethylthiomethylene malonic ester*

To one mole of metallic sodium dissolved in 500 cc. of absolute alcohol is added 1.02 moles of n-butyl malonic ester. This mixture is stirred while immersed in an ice-bath and one mole of ethylchloromethyl sulfide is slowly added, the temperature being kept below approximately 5° C. during the addition. When the mixture no longer gives a basic test with moist litmus, the alcohol is removed by distillation on a steam bath, the oily residue is washed with water and then fractionally distilled to yield n-butyl,ethylthiomethylene malonic ester, boiling at approximately 125–127° C. (uncorrected) at a pressure of about 2 mm. of mercury. The ester is represented by the following formula:

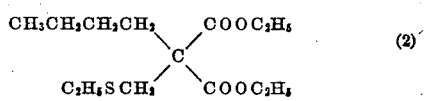  (2)

EXAMPLE 2

*Ethyl, secondary butylthiomethylene malonic ester*

To one mole of metallic sodium dissolved in 500 cc. of absolute alcohol is added 1.02 moles of ethyl malonic ester. The alcohol is then removed in a vacuum, and 500 cc. of dry toluene is added to the syrupy mass. This mixture is stirred and one mole of secondary butylchloromethyl sulfide is slowly added. When the mixture no longer gives a basic test with moist litmus, water is added, the toluene layer is separated, and is then fractionally distilled to yield ethyl secondary butylthiomethylene malonic ester, boiling at approximately 114–115° C. at a pressure of about 1.5 mm. of mercury. It is represented by the following formula:

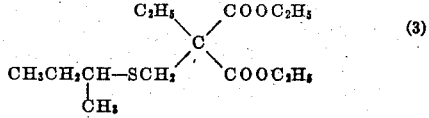  (3)

EXAMPLE 3

*Isobutyl, n-butylthiomethylene malonic ester*

To one mole of metallic sodium dissolved in 500 cc. of absolute alcohol is added 1.02 moles of isobutyl malonic ester. The alcohol is then removed in a vacuum and 500 cc. of dry toluene is added to the syrupy mass. This mixture is stirred and one mole of n-butyl chloromethyl sulfide is slowly added. When the mixture no longer gives a basic test with moist litmus, water is added, the toluene layer is separated, and is then fractionally distilled to yield isobutyl n-butylthiomethylene malonic ester, boiling at approximately 135–138° C. (uncorrected) at a pressure of about 1 mm. of mercury. It is represented by the following formula:

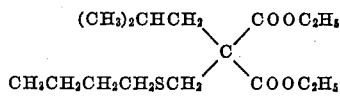

(4)

EXAMPLE 4

*Ethyl, n-hexylthiomethylene malonic ester*

To one mole of metallic sodium dissolved in 500 cc. of absolute alcohol is added 1.02 moles of ethyl malonic ester. The alcohol is then removed in a vacuum and 500 cc. of dry toluene is added to the syrupy mass. This mixture is stirred and one mole of n-hexylchloromethyl sulfide is slowly added. When the mixture no longer gives a basic test with moist litmus, water is added, the toluene layer is separated, and is then fractionally distilled to yield ethyl n-hexylthiomethylene malonic ester, boiling at approximately 138–140° C. (uncorrected) at a pressure of about 0.5 mm. of mercury. It is represented by the following formula:

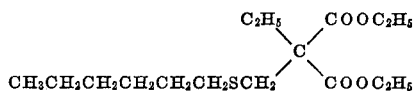

(5)

EXAMPLE 5

*Ethyl, allylthiomethylene malonic ester*

To one mole of metallic sodium dissolved in 500 cc. of absolute alcohol is added 1.02 moles of ethyl malonic ester. The alcohol is then removed in a vacuum and 500 cc. of dry toluene is added to the syrupy mass. This mixture is stirred, and one mole of allyl chloromethyl sulfide is slowly added. When the mixture no longer gives a basic test with moist litmus, water is added, the toluene layer is separated, and is then fractionally distilled to yield ethyl allylthiomethylene malonic ester, boiling at approximately 110–112° C. at a pressure of about 0.5 mm. of mercury. It is represented by the following formula:

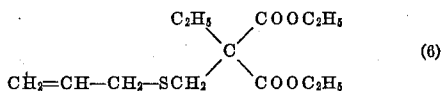

(6)

EXAMPLE 6

*Ethyl, cyclohexylthiomethylene malonic ester*

To one mole of metallic sodium dissolved in 500 cc. of absolute alcohol is added 1.02 moles of ethyl malonic ester. The alcohol is then removed in a vacuum, and 500 cc. of dry toluene is added to the syrupy mass. This mixture is stirred and one mole of cyclohexylchloromethyl sulfide is slowly added. When the mixture no longer gives a basic test with moist litmus, water is added, the toluene layer is separated, and is then fractionally distilled to yield ethyl cyclohexylthiomethylene malonic ester, boiling at approximately 144–147° C. (uncorrected) at a pressure of about 1 mm. of mercury. It is represented by the following formula:

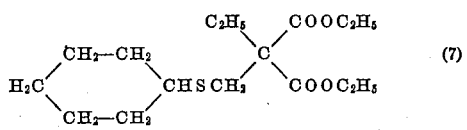

(7)

The following disubstituted malonic esters, which I have prepared, are embodiments of my invention and are illustrative of the generic class of compounds described above and claimed herein.

Malonic ester:

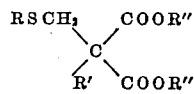

wherein:

| R is— | R' is— | Approximate boiling point °C. (uncorrected) | Pressure (approx.) (mm. of mercury) |
|---|---|---|---|
| Methyl | Isobutyl | 104–106 | 1 |
| Ethyl | Methyl | 94–95 | 1.2 |
| Do | Ethyl | 104–107 | 2 |
| Do | n-Propyl | 118–119 | 2 |
| Do | Isopropyl | 108–109 | 1.8 |
| Do | Allyl | 113–114 | 2.5 |
| Do | n-Butyl | 125–127 | 2 |
| Do | Isobutyl | 107–108 | 0.8 |
| Do | Sec. butyl | 114–116 | 1.5 |
| Do | 2-methylallyl | 115–117 | 1 |
| Do | Isoamyl | 123–126 | 1.7 |
| Do | 1-methylbutyl | 123–125 | 1 |
| Do | Phenyl | 149–151 | 1.2 |
| Do | n-Hexyl | 124–126 | 0.8 |
| Do | 2-ethylbutyl | 133.5–135 | 0.8 |
| Do | Δ1-cyclohexenyl | 142–146 | 1.0 |
| n-Propyl | Ethyl | 105–106 | 1 |
| Do | Allyl | 121–122 | 1.2 |
| Isopropyl | Ethyl | 105–106 | 2 |
| Do | Isopropyl | 107–109 | 1.4 |
| n-Butyl | Methyl | 114–117 | 2 |
| Do | Ethyl | 121–122 | 1 |
| Do | n-Propyl | 133–136 | 2 |
| Do | Isopropyl | 125–128 | 1 |
| Do | Allyl | 142–145 | 3 |
| Do | n-Butyl | 142–145 | 2 |
| Do | Isobutyl | 135–138 | 1 |
| Do | Sec. butyl | 128–130 | 0.5 |
| Isobutyl | Ethyl | 112–115 | 1.5 |
| Sec. butyl | do | 114–115 | 1.5 |
| Tert. butyl | do | 103–104 | 1.5 |
| n-Amyl | do | 134–135 | 1.1 |
| Isoamyl | do | 118–120 | 0.5 |
| 1-methylbutyl | do | 118–126 | 1.2 |
| n-Hexyl | do | 138–140 | 0.5 |
| Cyclohexyl | do | 144–147 | 1 |
| Allyl | do | 110–112 | 0.5 |

In the foregoing examples, the boiling points are approximate, and at about the pressures given; but are the boiling points which I actually observed, according to a procedure believed to be reliable.

Procedures suitable for making chloromethyl sulfides are disclosed in my co-pending applications, Serial Nos. 432,885 and 432,886, filed February 28, 1942, for "Allylchloromethyl sulfide" and "Chloromethyl sulfides" respectively.

The examples given above, and illustrative processes for their production, include the best embodiments of my present invention now known to me; but it is to be understood that the invention is not necessarily or specifically limited thereto and may, under proper conditions, have other embodiments, produced in other ways, without departure from the spirit of the invention, and within the scope of the following claims.

I claim:

1. As a new compound: a disubstituted malonic ester having the formula:

$$\begin{array}{c} RSCH_2 \diagdown \diagup COOR'' \\ C \\ R' \diagup \diagdown COOR'' \end{array}$$

wherein R and R' are hydrocarbon groups, each of which contains not more than six carbon atoms, and R' has a carbon atom directly attached to the methylene carbon of the malonic ester, R has a carbon atom directly attached to the sulfur of the thiomethylene group, and the sum of the carbon atoms in R and R' does not exceed 10; and wherein each R'' group is a lower alkyl group.

2. A disubstituted malonic ester according to claim 1, in which R and R' are primary hydrocarbon groups.

3. A disubstituted malonic ester according to claim 1, in which R is a secondary hydrocarbon group and R' is a primary hydrocarbon group.

4. A disubstituted malonic ester according to claim 1, in which R is a hydrocarbon group containing less than four carbon atoms.

5. A disubstituted malonic ester according to claim 1, in which R is the ethyl group.

6. A disubstituted malonic ester according to claim 1, in which R is a primary hydrocarbon group and R' is a secondary hydrocarbon group.

7. A disubstituted malonic ester according to claim 1, in which R is the ethyl group and R' is a secondary hydrocarbon group.

8. A disubstituted malonic ester according to claim 1, in which R is a primary hydrocarbon group, and R' is a secondary hydrocarbon group containing five carbon atoms.

9. A disubstituted malonic ester according to claim 1, in which R is the ethyl group, and R' is a secondary hydrocarbon group containing five carbon atoms.

10. A disubstituted malonic ester according to claim 1, in which R is a primary hydrocarbon group and R' is the 1-methylbutyl group.

11. A disubstituted malonic ester according to claim 1, in which R is the ethyl group and R' the 1-methylbutyl group.

12. 1-methylbutyl, ethylthiomethylene malonic acid diethyl ester.

13. Ethyl, 1-methylbutylthiomethylene malonic acid diethyl ester.

14. A disubstituted malonic ester according to claim 1, in which at least one of R and R' is a primary hydrocarbon group.

15. The process of producing a disubstituted malonic ester according to claim 1 which comprises treating approximately one mole of chloromethyl sulfide with approximately one mole of a sodio-malonic ester in the presence of an anhydrous organic solvent to produce a disubstituted malonic ester of the character recited in claim 1.

16. Isobutyl, methylthiomethylene malonic acid diethyl ester.

LEWIS A. WALTER.